United States Patent
Burg (12)

(10) Patent No.: US 6,438,222 B1
(45) Date of Patent: Aug. 20, 2002

(54) METHOD AND SYSTEM FOR PROCESSING A TELEPHONE CALL WHILE ON-LINE

(75) Inventor: Frederick Murray Burg, West Long Branch, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/219,222

(22) Filed: Dec. 23, 1998

(51) Int. Cl.$^7$ .................................................. H04M 3/42
(52) U.S. Cl. ........................ 379/215.01; 379/211.01; 379/207.15; 370/352
(58) Field of Search ............................... 379/142, 215, 379/127, 93.01, 93.09, 900, 211, 207.15; 370/352

(56) References Cited

U.S. PATENT DOCUMENTS

| | | | |
|---|---|---|---|
| 4,995,074 A | 2/1991 | Goldman et al. | |
| 5,179,585 A | 1/1993 | MacMillian, Jr. et al. | .... 379/88 |
| 5,274,700 A | 12/1993 | Gechter et al. | |
| 5,363,431 A | 11/1994 | Schull et al. | |
| 5,416,830 A | 5/1995 | MacMillian, Jr. et al. | .... 379/88 |
| 5,428,608 A | 6/1995 | Freeman et al. | |
| 5,533,110 A | 7/1996 | Pinard et al. | |
| 5,588,044 A | 12/1996 | Lofgren et al. | ............... 379/67 |
| 5,712,907 A | 1/1998 | Wegner et al. | |
| 5,724,412 A | 3/1998 | Srinivasan | ............... 379/93.23 |
| 5,742,596 A | 4/1998 | Baratz et al. | |
| 5,751,706 A | 5/1998 | Land et al. | |
| 5,768,513 A | 6/1998 | Kuthyar et al. | |
| 5,805,587 A | 9/1998 | Norris et al. | ............... 370/352 |
| 5,809,128 A | 9/1998 | McMullin | |
| 5,870,565 A | 2/1999 | Glitho | |
| 5,894,504 A | 4/1999 | Alfred et al. | |
| 5,896,444 A | 4/1999 | Perlman et al. | |
| 5,916,302 A | 6/1999 | Dunn et al. | |
| 5,946,381 A | 8/1999 | Danne et al. | |
| 6,011,909 A | 1/2000 | Newlin et al. | |

FOREIGN PATENT DOCUMENTS

| | | |
|---|---|---|
| AU | B 59680/98 | 9/1998 |
| CA | 2138565 | 6/1996 |
| DE | 3315884 | 11/1984 |
| EP | 0 758 175 A1 | 2/1997 |
| EP | 0 794 643 A2 | 9/1997 |
| EP | 0 800 325 A2 | 10/1997 |
| EP | 0 856 981 A2 | 8/1998 |

(List continued on next page.)

OTHER PUBLICATIONS

Conversant v6.0 Interactive Information Response (IIR) System www.lucent.com.au/product_range/mmedia/conversant.html Nov. 1998.

DataSmart T3/E3 IDSU, www.kentrox.com/products/15951/15951.htm Nov. 1998.

Maven Modem Summary, www.maven.com/Maven/Modems/Summary/05029601.htm Nov. 1998.

(List continued on next page.)

*Primary Examiner*—Creighton Smith

(57) ABSTRACT

The invention discloses a method and system for processing a telephone call to an on-line subscriber, when the subscriber telephone line is busy as a result of the on-line connection. The subscriber sets an on-line state, the state being available-for-incoming-calls or not-available-for-incoming-calls. Once the subscriber sets the on-line state, telephone calls to the subscriber telephone number while the subscriber is on-line are processed according to the on-line state. As examples, if the state is available-for-incoming-calls, the subscriber is notified of the incoming call and the call is processed according to the subscriber's instructions. If the state is not-available-for-incoming-calls, messaging according to the subscriber's preset instructions.

29 Claims, 6 Drawing Sheets

FOREIGN PATENT DOCUMENTS

| | | |
|---|---|---|
| EP | 0 905 959 A2 | 3/1999 |
| JP | 06217032 A | 8/1994 |
| JP | 07170288 A | 7/1995 |
| WO | WO 95/18501 | 7/1995 |
| WO | WO 97/14238 | 4/1997 |
| WO | WO 97/16007 | 5/1997 |
| WO | WO 97/37483 | 10/1997 |
| WO | WO 97/46073 | 12/1997 |
| WO | WO 97/47118 | 12/1997 |
| WO | WO 97/47119 | 12/1997 |
| WO | WO 97/47127 | 12/1997 |
| WO | WO 98/01985 | 1/1998 |
| WO | WO 98/07266 | 2/1998 |
| WO | WO 98/19240 | 5/1998 |
| WO | WO 98/19448 | 5/1998 |
| WO | WO 98/19471 | 5/1998 |
| WO | WO 98/24224 | 6/1998 |
| WO | WO 98/36551 | 8/1998 |
| WO | WO 98/41032 | 9/1998 |
| WO | WO 98/51063 | 11/1998 |
| WO | WO 98/52332 | 11/1998 |
| WO | WO 98/52339 | 11/1998 |
| WO | WO 98/53617 | 11/1998 |
| WO | WO 98/54871 | 12/1998 |
| WO | WO 99/14924 | 3/1999 |

OTHER PUBLICATIONS

Maven Modem Features Summary, wysiwyg://99http://www.maven.com/Maven/Modems/Summary/05029601.htm Nov. 1998.

AT&T Instant Answers, www/att.com/features/0896/call-menow.html, Sep. 1998.

AT&T News Release, www/att.com/press/0896/960827.bsa.html, Sep. 1998.

Joanie Wexler, Industry gets serious about 'net phone calls, Infoworld, Nov. 25, 1996, p. 39.

Will Wade, Net–Based phone Created, Electronic News, Jan. 19, 1998, pp. 16–17.

Frank Barbetta, PBXs Take Multiple Paths to the Future, BCR's Voice 2000, May 1998, pp. 32–36.

Glen Hunt, Voice Over IP Presents New Opportunities for Resellers, Computer Technology Review, Aug. 1988, p. 14.

RFC 1789 (http:www.faqs.org/rfcs/rfc1789.html), Apr. 1995.

Workstation Communications System, IBM Tech. Disclosure Bulletin, V. 37, No. 09, Sep. 1994, pp. 102–104.

The Internet Telephony Red Herring, *Colin Low*, Hewlett Packard, HPL–96–98, Jun. 1996.

Intelligent Network Realization and Evolution: CCITT Capability Set 1 and Beyond, S. Harris et al., International Switching Symposium, Yokohama, Japan, Oct. 25–30, 1992, Proceedings V. 2, pp. 127–131.

Internet Phone—Changing the Telephony Paradigm? R. Babbage et al., BT Technol J V. 15, N. 2, Apr. 1997, pp. 145–157.

Dial 1–800–Internet, Nathan Muller, BYTE, Feb. 1996, pp. 83–88.

METHOD AND SYSTEM FOR PROCESSING A TELEPHONE CALL WHILE ON-LINE

FIELD OF THE INVENTION

The invention relates generally to the field of telephony and specifically to the field of telephony in conjunction with on-line access.

BACKGROUND OF THE INVENTION

Many computer users connect to outside data services through a dial-up type connection. As known in the field, this connection typically uses a MODEM to convert digital computer signals to analog signals for transmission over the public switch telephone network. For many users, the switched telephone network connection used for their outside data services is the same connection used for traditional analog voice telephone services, and when connected to the outside data service, the telephone line associated with their telephone number is busy.

In the field of voice telephony, many optional services are provided such as call waiting and call forwarding to accommodate the subscriber. Because of differences in protocols and procedures, these services may be unavailable when the user is connected to the outside data service. Various methods and systems are proposed to improve telephony service for users when they are on-line. U.S. Pat. No. 5,805,587 (the '587 patent) to Norris et al., the specification of which is incorporated herein by reference, describes one such method and system used by a subscriber when on-line.

Current systems and methods do not allow a subscriber to set a particular state while on-line. In particular, a subscriber is unable to set an on-line state of available-for-incoming-calls or an on-line state of not-available-for-incoming-calls. There is a need to provide this and other options for subscribers when on-line.

SUMMARY OF THE INVENTION

An objective of the invention is to provide a method and system for processing a telephone call where a subscriber telephone connection is busy as a result of an on-line connection and the subscriber wishes to have incoming calls handled according to whether they have set an available-for-incoming-calls state or a not-available-for-incoming-calls state.

DETAILED DESCRIPTION

An on-line subscriber needs the ability to set different states while on-line. For example, among the possible states, the subscriber needs the ability to set an available-for-incoming-calls state and a not-available-for-incoming-calls state. A not-available-for-incoming-calls state allows a subscriber to work on-line without being disturbed while processing incoming calls according to preset instructions. An available-for-incoming-calls state allows a subscriber to be informed of all incoming calls while on-line and process the call at that time. Once the subscriber has set their on-line state, other features are also useful.

A call-back list to store information or particulars related to incoming calls received while on-line and in a not-available-for-incoming-calls state is useful.

An on-line state is also useful for a subscriber with a voice-mail or general message forwarding service that handles incoming telephone calls according to pre-established criteria. An on-line state is also useful for the subscriber who wants to take an incoming telephone call while on-line.

SYSTEM DESCRIPTION

Figure 1:
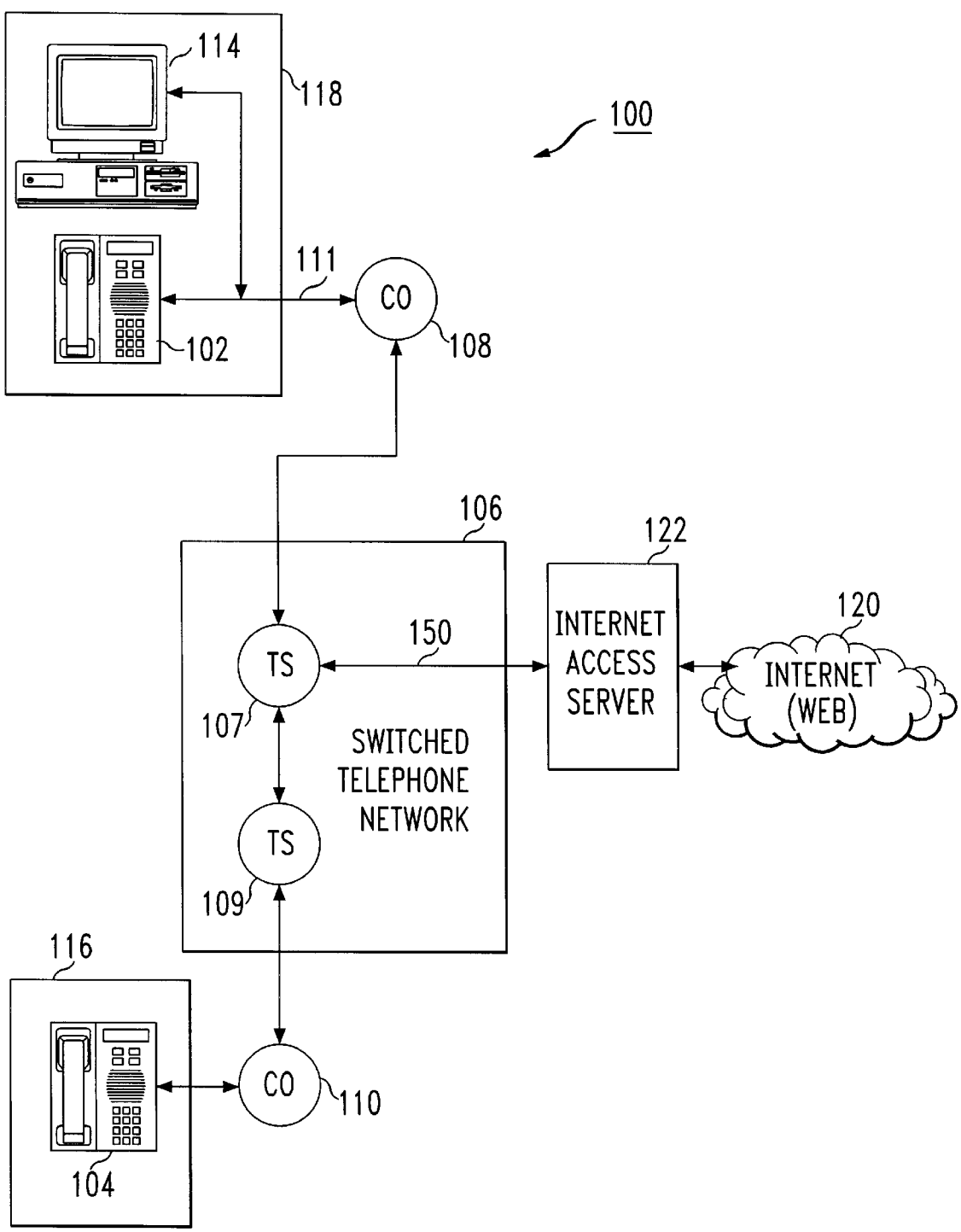
FIG. 1 illustrates a telecommunications system in which the principles of the invention may be practiced.

Referring to FIG. 1, a representative system 100 of the invention includes telephone instruments 102, 104 each connected to the switched telephone network 106 through central offices 108, 110. Connection 111 between telephone instrument 102 and the switched telephone network is typically a twisted pair wire cabling, but it can be any form of signal transmission media, including fiber optic and wireless. System 100 also includes data terminal 114, such as a personal computer, that is connected to the switched telephone network by connection 111. Using the configuration of FIG. 1, a subscriber at calling station 116 can connect telephone 104 to telephone 102 at called station 118 through central office 110, the switched telephone network 106, and central office 108. This connection is readily accomplished as long as data terminal 114 is not also connected to the switched telephone network by connection 111.

In an illustrative embodiment of the invention, data terminal 114 may be, for example, a personal computer running under the Microsoft Windows 95 operating system and driven by, for example, the Intel Pentium processor. Data terminal 114 includes a conventional sound card, such as the SoundBlaster sound card, as well as attached speakers and microphone. Also, conventional software packages such as Netscape Communcator (Netscape) software and NetMeeting (Microsoft) software are loaded in data terminal 114. As configured, a conventional modem interfaces data terminal 114 with connection 111.

Using system 100, a subscriber at station 118 can also connect data terminal 114 to the Internet 120 for access to on-line data services. The subscriber may not connect to the Internet if he/she is concerned about missing an important call. To connect, data terminal 114 establishes an off-hook condition on connection 111 and, using a series of DTMF tones, connects to Internet Access Server 122 through central office 108 and the switched telephone network. Once thus connected to the Internet, connection 111 is busy and any call from station 116 to station 118 will find the telephone number of station 118 busy. In addition, the subscriber at station 118 will not know of an incoming call from station 116. This is because the call waiting protocol, normally available for voice telephony calls to telephone instrument 102 at station 118, must be disabled in order for data terminal 114 to maintain an error-free connection to the Internet 120.

Further describing system 100 in FIG. 1, the user or subscriber associated with station 118 may access the Internet 120 by first loading appropriate Internet communications software, e.g., the Netscape Communicator software product, from Netscape, Inc. (hereinafter "Netscape" software), into the memory of data terminal 114. Data terminal 114 may be, for example, a personal computer having multimedia and telephony capability, as previously described. The subscriber, in a conventional manner, may then cause data terminal 114 to place a telephone call to an Internet Access Server that the subscriber is associated with, such as Internet Access Server (IAS) 122 to access the Internet, represented by block 120.In doing so, data terminal 114 places telephone line 111 in an off-hook state and then dials the telephone number assigned to IAS 122. Assuming that IAS 122 is not located in the same local dialing region as data terminal 114, then the telephone call will be routed via switched telephone network 106, e.g., the AT&T network. Specifically, upon receipt of the dialed number, Central Office (CO) 108, in a conventional manner, establishes a telephone connection to toll switch (TS) 107 and passes the called number and the ANI associated with line 111 to TS 107. TS 107, in turn and in a conventional manner, establishes a connection to IAS 122 via communication path 150. In an illustrative embodiment of the invention, communication path 150 may be one or more conventional T1 carrier lines each having 24 communications channels in which at least one of the channels serve as a signaling channel. TS 107 thus routes the call to IAS 122 by sending a so-called call set-up message over the signaling channel, in which the message identifies, inter alia, the T1 channel carrying the incoming call, called number, and calling ANI. IAS 122 answers the call by sending an "acknowledgment" message over the signaling channel to TS 107. IAS 122 then sends conventional data communications signals to the data terminal 114 software that is adapted to allow the subscriber to communicate/interface with Internet 120.

Figure 2:
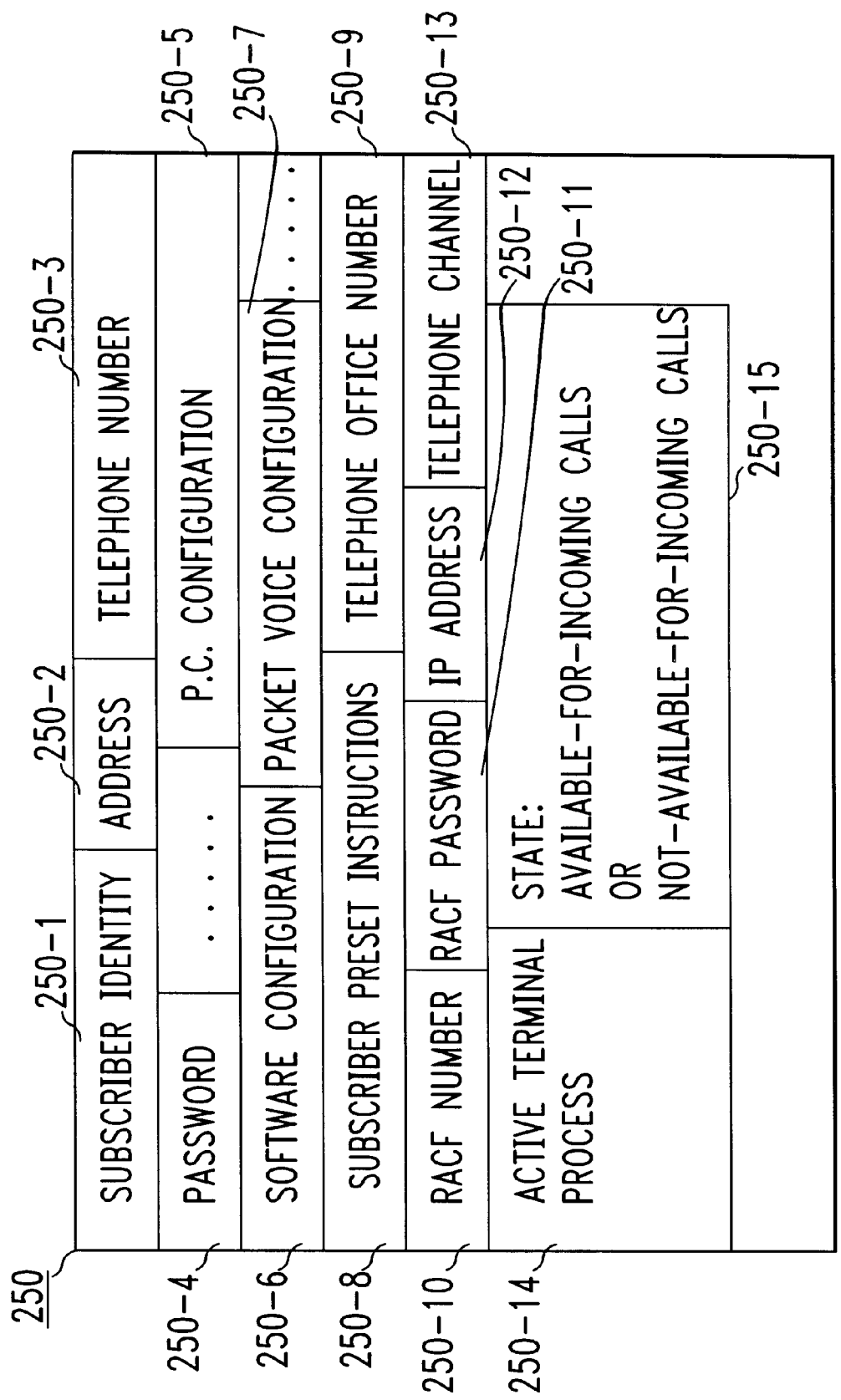
FIG. 2 is an illustrative example of a data record that may be used to implement the inventive service in the system of FIG. 1.

Responsive to receipt of the subscriber's incoming call, IAS 122 captures a subscriber identity and password from the data-stream of the subscriber's incoming call. IAS 122 uses the subscriber identity to access its internal memory to unload a data record that is associated with the subscriber. An illustrative example of such a record is shown in FIG. 2. Specifically, record 250 is formed from a number of fields respectively containing the subscriber's identity (name) 250-1, address 250-2, telephone number (ANI) 250-3, password 250-4, and other data. IAS 122 permits the caller to access Internet 120 if the identity and password that the caller/subscriber enters via data terminal 114 matches the contents of fields 250-1 and 250-4. If such a match does not occur after the caller has made a number of attempts to enter the correct identity and password via data terminal 114, then IAS 122 terminates the call, as is done conventionally whenever a login fails. Assuming a match occurs, then IAS 122 communicates with the caller in accord with the contents of fields 250-5 and 250-6 (FIG. 2) which respectively specify the configuration of data terminal 114 and configuration of the Internet interface software, e.g., the aforementioned Netscape software, loaded in data terminal 114. In addition, IAS 122 assigns an Internet IP address to the data terminal and stores the address in field 250-12. (Alternatively, IAS 122 may assign such an address to the subscriber just once, when the subscriber initially enters a subscription for the service as is done conventionally.) IAS 122 thereafter uses the address to route the subscriber's data messages (packets) to and from Internet 120 via a conventional data router, as will be discussed below. IAS 122 also stores the address of the communications path 150 (i.e., B channel) used to receive the call in field 250-13. The subscriber may then begin to access Internet 120 in a conventional manner. That is, data terminal 114 formulates and transmits data packets addressed to Internet destinations indicative of entries/inquiries specified by the subscriber as a result of interacting with Internet 120 using the software loaded in data terminal 114. Similarly, IAS 122 routes via path 150 and TS 107 packets that it receives from the Internet and addressed to data terminal 114.

Figure 3:
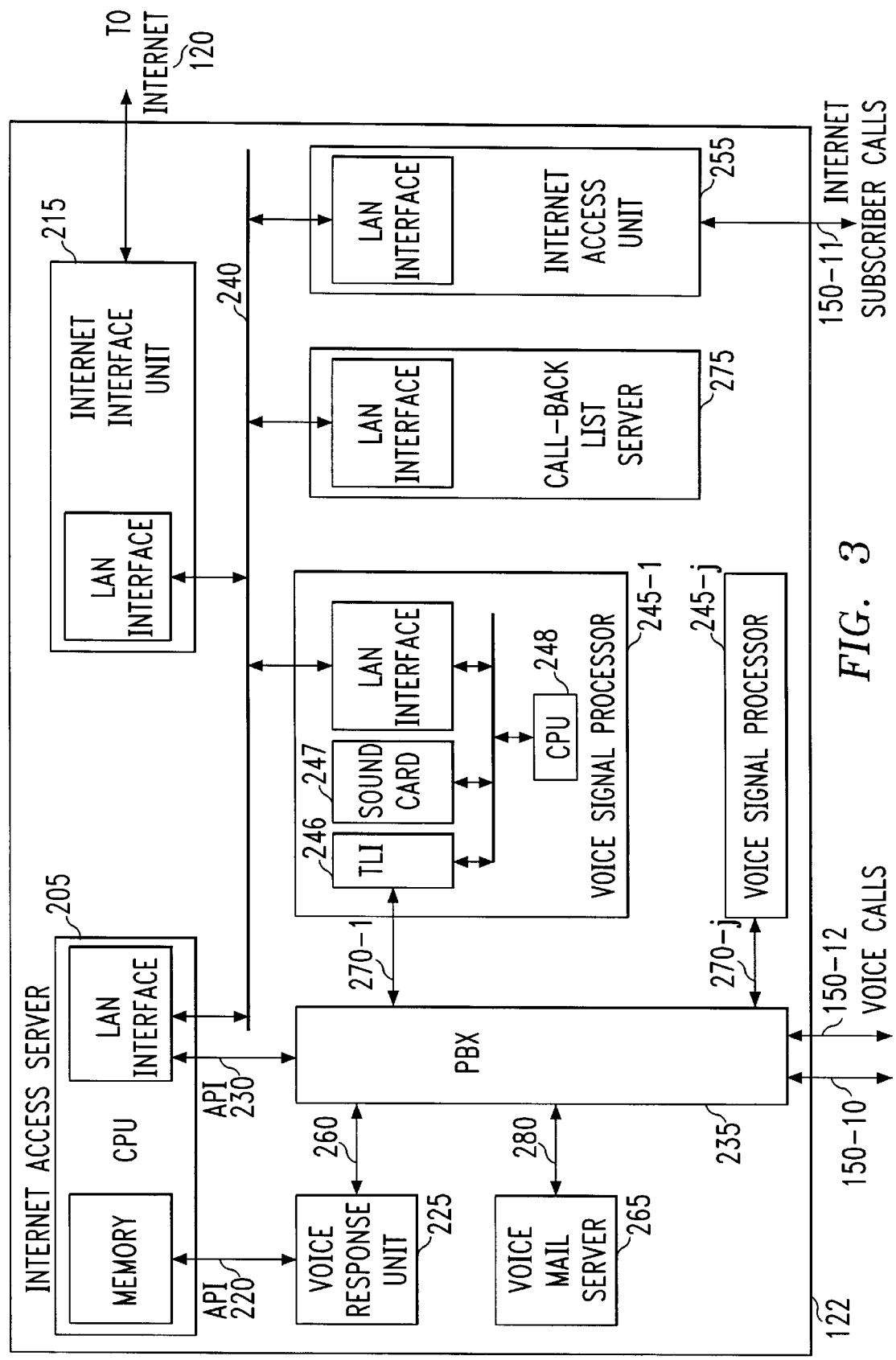
FIG. 3 is a block diagram of the Internet Access Server (IAS) of FIG. 1.

More specifically and also referring now to FIG. 3, it is seen that an IAS 122 includes Central Processor Unit (CPU) 205, which may be, for example, the SPARC 10 workstation commercially available from Sun Microsystems, Inc. CPU 205, which operates under the control of the well-known UNIX operating system, communicates with the various elements forming the associated IAS 122 via so-called Attached Processor Interfaces (API) 220 and 230, and via local area network (LAN) 240. Such elements include PBX 235 and Internet Access Unit (IAU) 255, in which PBX 235, may be, for example, the DEFINITY telecommunications system available from LUCENT and in which IAU 255 may be, for example, the Ascend MAX 4000 apparatus available from Ascend Communications, Inc. of Mountain View, Calif. PBX 235 and IAU 255, more particularly, are designed to present an interface to a communication path comprising 23 B channels and one D channel, e.g., T1 carrier 150-10, 150-11 and 150-12. Each such B channel may be used to establish a call connection between a telephone switch, e.g., TS 107, and the associated IAS 122. The D channel, on the other hand, may be used to transport signaling information relating to a B channel call connection.

(As will be discussed below, TS 107 routes calls directed to Internet 120 via IAS 122 over path 150-11 and routes calls that are forwarded to IAS 122 over path 150-10.)

IAS 122 includes conventional Voice Response Unit (VRU) 225 which may be, for example, the CONVERSANT interactive information response (IIR) system available from LUCENT. It also includes a conventional voice-mail server (VMS) 265, for example, the LUCENT AUDIX telecommunications voice processor, for message recording and general messaging service. As will be discussed below, VRU 225 and VMS 265 are connected to PBX 235 via respective communications paths 260 and 280. IAS 122 further includes an Internet Interface Unit (IIU) 215 for providing a physical as well as a logical interconnection between LAN 240 and Internet 120. IIU 215 includes a conventional data router, for example, the model 7000 router available from Cisco Systems Inc., and a high-speed data service unit, for example, the DataSMART T3/E3 IDSU available from Kentrox of Portland, Oreg.

IAS 122 includes a plurality of voice signal processors (VSP) 245-1 through 245-j, one of which is illustrated in broad block diagram form, namely, VSP 245-1 (hereinafter just (VSP) 245). VSP 245 includes central processor unit (CPU) 248, telephone line interface (TLI) 246, sound card 247 and a connection to LAN 240. VSP 245 communicates with PBX 235 via a selected one of the paths 270, and communicates with processor 205, IIU 215 and IAU 255 via LAN 240. In an illustrative embodiment of the invention, VSP 245, may be, for example, a personal computer having an Intel Pentium processor running under the Microsoft Windows NT operating system, an Etherlink 10 BASE-T LAN interface card, a sound card 247 and a telephone line interface or modem 246.

VSP 245 interconnects conventional telephone signaling messages (e.g., D channel) and voice signals (e.g., B channel) received from switched telephone network 106 via PBX 235 and path 270-1 with conventional TCP/IP packet network communications that are transported over LAN 240 and Internet 120. The processing of calls forwarded from switched telephone network 106 and routed to Internet 120 via LAN 240 will be explained below in details It is noted at this point, however, that particular software, such as Microsoft NetMeeting software, may be used in VSP 245 to process, compress and then packetize voice signals that are received via PBX 235 and TLI 246 for transmission to Internet 120 via LAN 240. Similarly, such software may be used to convert the contents of packets representing voice into a stream of voice signals that is transmitted to station 116 via sound card 247, TLI 246, path 270-1, PBX 235, path 150-10, switched telephone network 106, TS 109, and CO 110.

IAS 122 also includes call-back list server 275 which may be, for example, a personal computer having an Intel Pentium processor running under the Microsoft Windows NT operating system, an Etherlink 10 BASE-T LAN interface card, and Microsoft ACCESS database application to store particulars of the call-back list. Call-back list server 275 is connected to and communicates with other elements of IAS 122 via LAN 240.

Log-In

When a subscriber's Internet Access call (placed via data terminal 114) is received via a B channel of path 150-11, IAU 255 verifies subscriber service with a conventional login procedure. If the caller provides the correct identity and password (e.g., the password contained in field 250-4 of the associated record (FIG. 2), which IAU 255 also obtains as a result of communicating with processor 205 via LAN 240), then IAU 255 assigns a conventional IP address to the data terminal as a way of interfacing the call (assigned B channel) with Internet 120 via IIU 215. (It is noted that for a conventional Internet Access Server arrangement, the subscriber is assigned a permanent IP address which would be stored in field 250-12 (FIG. 2) at the time that the subscriber obtains the service.) In addition, IAU 255 notifies processor 205 that it has established the connection between data terminal 114 and the Internet 120.

Figure 4:
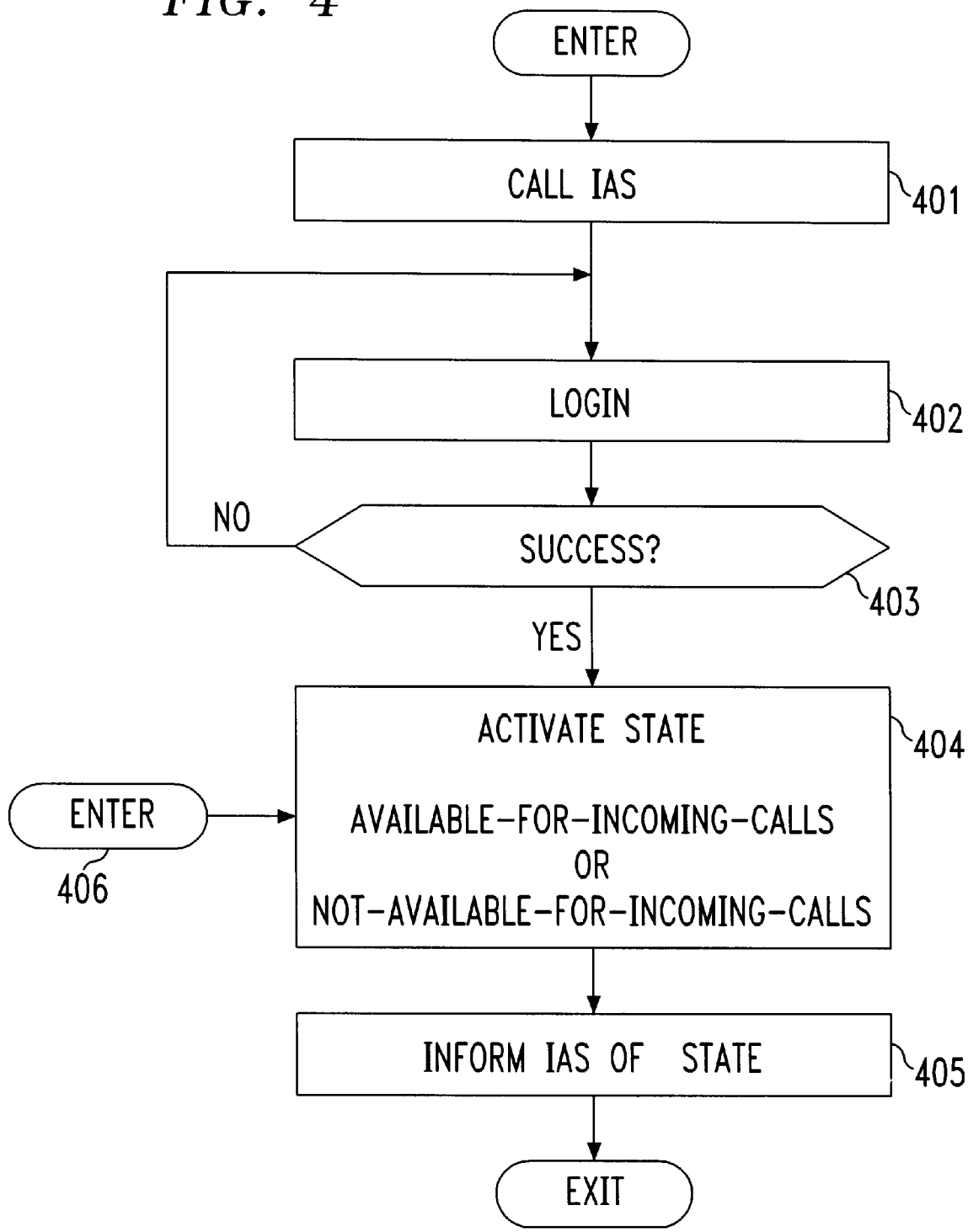
FIG. 4 illustrates in flow chart form a log-in program which implements the principles of the invention.

Referring to FIG. 4, the login steps of the invention are illustrated in flow chart form. In these steps, data terminal 114, places a telephone call to an IAS, e.g., IAS 122, for the purpose of establishing a connection to the Internet 120. Software to establish the connection may be any one of a number of different software products that are designed to allow a subscriber to establish a telephone connection to an ISP, for example the Microsoft dial-up connection. Specifically, at step 401, when the dial-up terminal program is invoked it unloads from internal memory a data record containing the telephone number that the caller uses to access IAS 122. The program then prompts the subscriber for a user identity and password. The program then places a call to that telephone number and waits for receipt of a response from the called IAS, e.g., IAS 122.

At step 402, upon receipt of the expected response, the program sets up to "login" into the called IAS as is done conventionally by transmitting the subscriber identity and password.

At step 403, if the login is successful, the terminal application program sends a message to processor 205 indicating that it is an active terminal. If processor 205 receives that message, then it updates the contents of field 250-14 (FIG. 2) to indicate that the subscriber terminal is active.

If the login is not successful then, at step 402, the caller/subscriber may re-enter his/her identity and password. It is noted that IAS 122 may terminate the call if the caller fails to enter a valid password after making several attempts to do so.

At step 404, the subscriber activates an on-line state. The on-line state may be available-for-incoming-calls or not-available-for-incoming-calls.

At step 405, the terminal application program reports this state to processor 205 by sending a message. Upon receiving this message, processor 205 updates the contents of field 250-15 (FIG. 2). The program then exits.

Call Forwarding Setup

Figure 5:
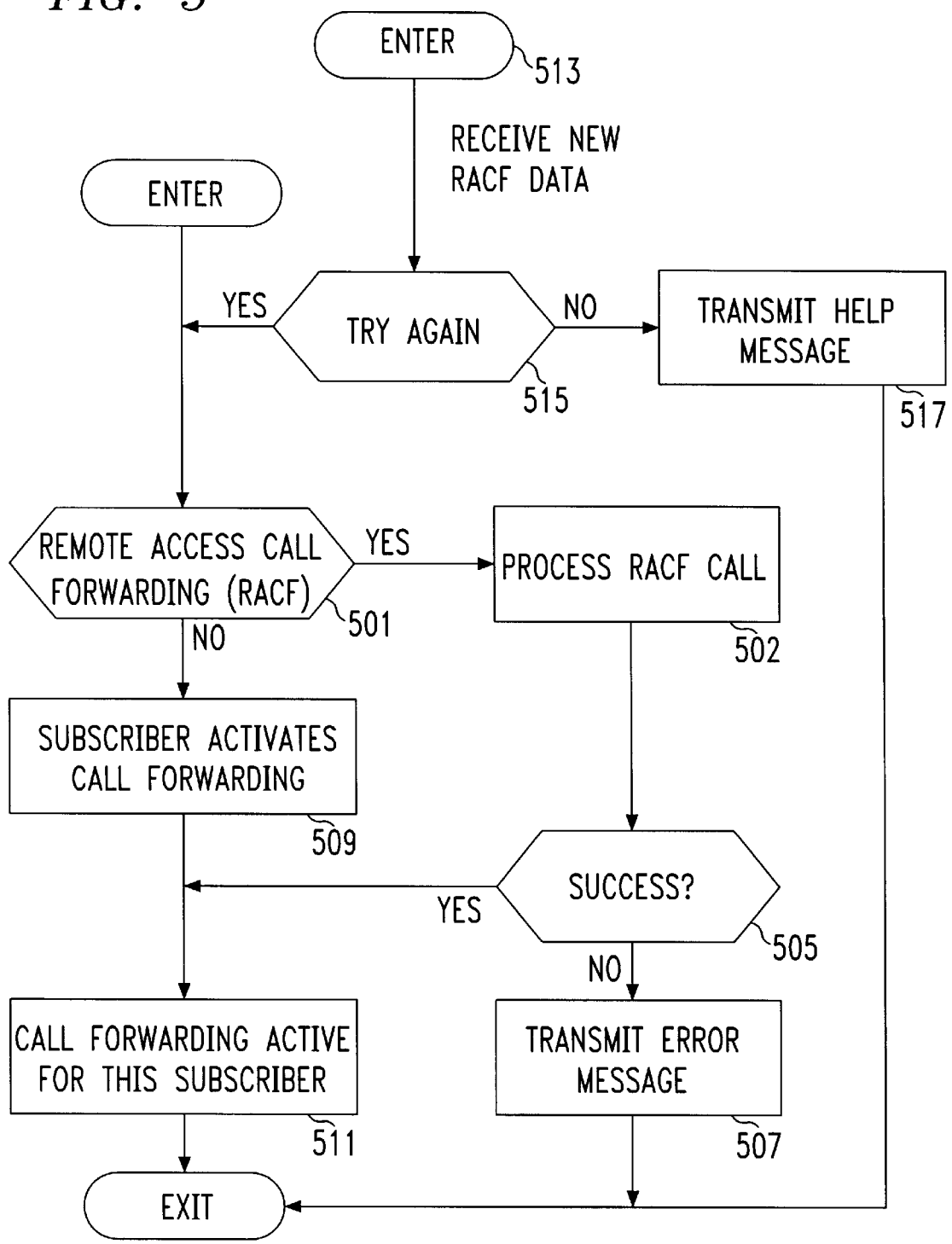
FIG. 5 illustrates in flow chart form a call forwarding program which implements the principles of the invention.

If the login is successful, then processor 205 invokes the program of FIG. 5. At step 501, processor 205 checks contents of record 250 to determine if a call-forwarding function is activated/deactivated remotely by IAS 122. (Such remote activation will also be referred to herein as Remote Access Call Forwarding (RACF) and is a feature that is currently offered by a local exchange carrier, e.g., Bell Atlantic by the service name of "Ultraforward" (service mark of Bell Atlantic), for a telephone call not involving the Internet.) Alternatively, such contents may indicate that the call forwarding function is selective and/or activated by the subscriber.

At step 503, assuming that the call forwarding function will be activated remotely by IAS 122, then processor 205 unloads a telephone number that it needs to call to activate the call forwarding service from field 250-9, which number is assumed to be associated with CO 108. Processor 205 then instructs VRU 225 via API 220 to place an out-going call to CO 108. In response to receiving an outgoing call request from VRU 225 via path 260, PBX 235 selects an idle channel of communications path 150 (FIG. 1) and sends a call set-up message via the associated signaling channel to TS 107, in which the message includes the telephone number unloaded from field 250-9. TS 107, in turn, translates the called telephone number into a routing indicator, and, in accord with that indicator, establishes a telephone connection in a conventional manner to the CO 108 call forwarding service. That service responds to the incoming call by interacting with VRU 225 (which executes a "script" that it receives from processor 205) to obtain the subscriber's telephone number (250-3) and RACF password (field 250-11). Processor 205, via VRU 225 and in response to the latter request, outputs the contents of field 250-10 to the telephone connection extending back to CO 108, which contents is a telephone number associated with communication path 150-10 (FIG. 3) that is used for receiving forwarded calls, as will be discussed below. As a result of such interaction, CO 108 is thus primed during the time that station 118 is busy to forward a call directed to station 118 to IAS 122.

At step 505, processor 205 then checks to see if it had been successful in activating Remote Access Call Forwarding (RACF), as noted by the receipt of a confirmation from VRU 225 indicating that it had successfully interacted with CO 108.

At step 507, if call forwarding is not successful, processor 205 sends an error message to data terminal 114 for display. The message identifies the nature of the failure, which may be, for example, that CO 108 did not answer the out-going call or that VRU 255 received an error message from CO 108 after VRU 225 had transmitted the subscriber telephone number, subscriber RACF password or the forward-to telephone number. Processor 205 then exits the program.

If the contents of record 250 indicate that call-forwarding is selective and/or activated by the subscriber, then, at step 509, processor 205 presumes that the subscriber has activated call-forwarding to IAS 122. Call-forwarding by the subscriber to IAS 122 is performed according to the features of the call-forwarding service.

At step 511, processor 205 then sets up to monitor for calls that are forwarded to IAS 122 as a result of the data terminal 114 subscriber's telephone line 111 being busy on the Internet. The processor 205 program then exits.

If the subscriber, in response to the displayed failure message, enters a request for an RACF activation retry, in which the request may contain a corrected CO 108 RACF service telephone number or another password that is to be supplied to CO 108, then the processor program is entered at step 513 and proceeds to step 515.

At step 515, if the subscriber entered a valid request, and an error threshold has not been exceeded, then the processor program returns to step 502. In doing so, the program unloads the associated record 250 from memory.

At step 517, if the subscriber does not enter a valid request or repeatedly fails to enter a correct password, then processor 205 transmits a help message and exits.

Incoming Call Processing

In preceding steps, the subscriber establishes call-forwarding to IAS 122 and sets an on-line state of available-for-incoming-calls or not-available-for-incoming-calls. If, while the subscriber is busy "surfing" the Internet, a caller at station 116 (the calling station) places a call to station 118 (the called station), then a telephone connection is established in a conventional manner from the station 116 telephone line to CO 108 via CO 110, TS 109 and TS 107 (FIG. 1). Specifically, responsive to the receipt of the station 116 call, CO 108 determines that station 118 is busy and that station 118 has activated call forwarding to IAS 122. As such, CO 108, in a conventional manner, directs the call to IAS 122 in accord with the call forwarding telephone number that CO 108 received as interacting with IAS 122 in the manner discussed above. Activation of call-forwarding is by the RACF process illustrated in FIG. 5, or by conventional call-forwarding procedures. In forwarding calls, CO 108 sends a message to TS 107 requesting a rerouting of the station 116 call and containing the IAS 122 telephone number as the destination for such rerouting. Such a message will typically contain the telephone number of the called party (station 118) and may also contain the telephone number and caller identification of the forwarded party, namely station 116. TS 107, in response to the receipt of the message, routes the call to its new destination, IAS 122. To re-route the call, TS 107 signals IAS 122 (PBX 235) that a call is being routed (forwarded) thereto via an idle B channel serving the particular call type, in which such signaling is transmitted over the associated D signaling channel. (As mentioned above, if the call is being forwarded to IAS 122, then TS 107 routes the call via path 150-10. Calls directed to Internet 120, on the other hand, are routed over communications path 150-11.) The signaling information that is transported over a D channel of path 150-10 includes, inter alia, the forward-to-number used by CO 108 and the telephone number of station 118. Such information may also include the calling party telephone number (station 116). PBX 235, responsive to receipt of such information, sends a message identifying the newly-arrived call and containing information relating thereto to processor 205 via API 230.

Figure 6:
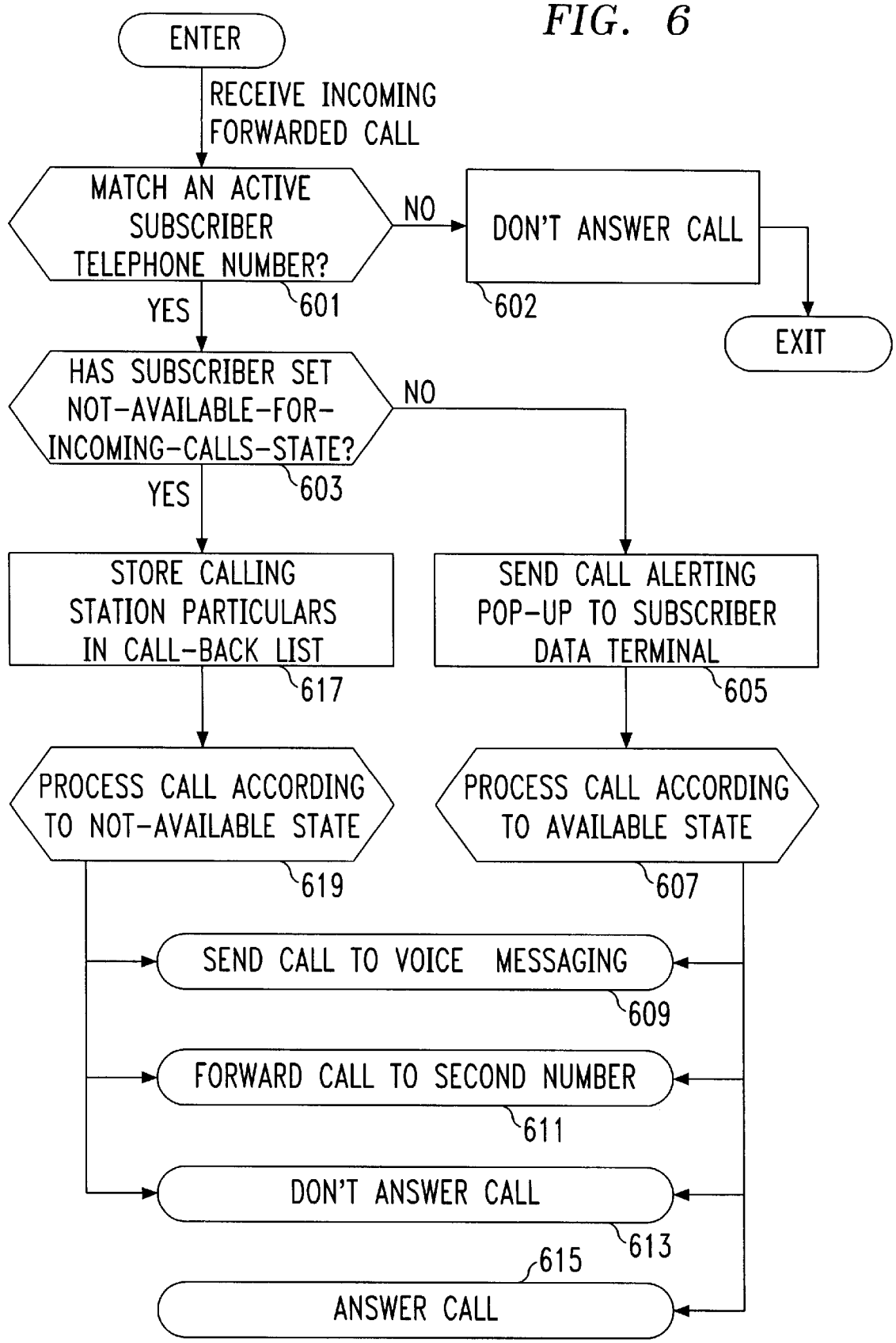
FIG. 6 illustrates in flow chart an incoming call processing program which implements the principles of the invention.

Since the station 116 call is forwarded to IAS 122 via path 150-10, then the call is received via PBX 235. Referring now to FIG. 6, upon receipt of the call, PBX 235 alerts processor 205 to the incoming call and passes the station 116 telephone number as well as the station 118 telephone number thereto. At step 601, processor 205, in response to receipt of the station 118 ANI uses the number to access its internal memory, unload a copy of the subscriber's record 250 and check for an active terminal.

At step 602, if the subscriber is not connected to IAS 122, then processor 205 does not answer the call and exits, thereby leaving it to the calling party and PBX 235 to terminate the call in a conventional manner.

At step 603, processor 205 checks the contents of field 250-15, FIG. 2, to determine if the called subscriber has set a not-available-for-incoming-calls on-line state. If the subscriber has not set that on-line state, then at step 605, processor 205 sends an alerting pop-up to the subscriber data terminal. The pop-up is similar to the pop-up described in the '587 patent.

At step 607, processor 205 processes the call according to the subscriber's instructions for an available-for-incoming-calls on-line state. The subscriber instructions can include sending the call to voice messaging 609, forwarding the call to a second number 611, letting the call go unanswered 613 or answering the call 615.

If the contents of field 250-15, FIG. 2, indicate that the subscriber has set a not-available-for-incoming-calls state, then, at step 617, processor 205 stores particulars of the call in the subscribers' call-back list at call-back list server 275.

At step 619, processor 205 processes the call according to the subscriber's instructions for a not-available-for-incoming-calls on-line state. The subscriber instructions are stored in field 250-8 of FIG. 2 and can include sending the call to voice messaging 609, forwarding the call to a second number 611, and letting the call go unanswered 613.

At step 609, when the call is sent to voice messaging, processor 205 instructs PBX 235 via API 230 to connect the call to VMS 265, where the caller is given the opportunity to leave a voice message.

At step 611, when the call is forwarded to a second number, processor 205 instructs VRU 225, via API 220 to place an out-going call to the second number. In response to receiving an out-going call request from VRU 225 via path 260, PBX 235 selects an idle channel of path 150 (e.g. path 150-12) and places a call to the second number using that path. When the connection to the second number is established, processor 205 instructs PBX 235 to bridge the call from the calling station on path 150-10 to the second number on path 150-12, thereby forwarding the call to the second number.

At step 613, when the call is not answered, processor 205 either informs the caller that the called station is unavailable to take the call and disconnects the call, or allows the call to ring unanswered.

At step 615, when the call is answered, processor 205 routes the incoming call from PBX 235 to VSP 245, where the calling station analog voice is digitized and packetized using processor 248, telephone line interface 246, and sound card 247. The packetized voice is routed via LAN 240 to IAU 255, where the packets are forwarded over path 150-11 to the subscriber at data terminal 114. The digitized and packetized speech is converted at data terminal 114 to analog voice and reproduced by the sound card and speakers at data terminal 114. Speech from the subscriber at data terminal 114 follows a reverse path. The microphone at data terminal 114 captures the subscriber voice, where it is digitized by the sound card and packetized for transmission over path 150-11. IAU 255 receives the packetized speech from the subscriber and routes it to VSP 245 via LAN 240. VSP 245 converts the packetized and digitized voice from the subscriber to analog voice and routes it to PBX 235, completing the return path from the subscriber to the caller.

In the preceding embodiment, the subscriber sets the on-line state during initial log-in to IAS 122. Alternatively, the subscriber can change the on-line state while on-line. This is illustrated in FIG. 4, where the subscriber enters the program at step 406, and the subscriber activates the desired on-line state at step 404.

The foregoing is merely illustrative of the principles of the invention. Those skilled in the art will be able to devise numerous arrangements, which, although not explicitly shown or described herein, nevertheless embody those principles that are within the spirit and scope of the invention.

I claim:

1. A method comprising:
   receiving a telephone call directed to a called station from a calling station; and
   determining an on-line state of a data terminal at the called station, the called station being busy as a result of a data connection between the data terminal and a server, the on-line state being available-for-incoming-calls or not-available-for-incoming-calls.

2. A method according to claim 1, further comprising processing the telephone call according to the on-line state.

3. A method, comprising:
   connecting a data terminal at a called station to a server by a data connection, the called station being busy as a result of the data connection; and
   setting an on-line state for the data terminal, the state being available-for-incoming-calls or not-available-for-incoming-calls.

4. A method according to claim 3, further comprising informing the server of the on-line state.

5. A system comprising:
   a server; and
   a data connection for connecting the server to a data terminal at a called station, the called station being busy as a result of the data connection, the server processing a call from a calling station to the called station according to an on-line state of the data terminal, the on-line state being available-for-incoming-calls or not-available-for-incoming-calls.

6. A system comprising:
   a data terminal at a called station, the data terminal having an on-line state, the on-line state being available-for-incoming-calls or not-available-for-incoming-calls; and
   a data connection, for connecting the data terminal to a server, the called station being busy as a result of the data connection, a call from a calling station to the called station being processed according to the on-line state.

7. A system comprising:
   means for receiving a telephone call directed to a called station from a calling station; and
   means for determining an on-line state of a data terminal at the called station, the called station being busy as a result of a data connection between the data terminal and a server, the on-line state being available-for-incoming-calls or not-available-for-incoming-calls.

8. A system according to claim 7, further comprising means for processing the telephone call according to the on-line state.

9. A system comprising:
   means for connecting a data terminal at a called station to a server by a data connection, the called station being busy as a result of the data connection; and
   means for setting an on-line state for the data terminal, the state being available-for-incoming-calls or not-available-for-incoming-calls.

10. A system according to claim 9, further comprising means for informing the server of the on-line state.

11. Computer executable software code stored on a computer readable medium, the code for processing a telephone call, the code comprising:
    code for receiving a telephone call directed to a called station from a calling station; and
    code for determining an on-line state of a data terminal at the called station, the called station being busy as a result of a data connection between the data terminal and a server, the on-line state being available-for-incoming-calls or not-available-for-incoming-calls.

12. Computer executable software code according to claim 11, further comprising code for processing the telephone call according to the on-line state.

13. A computer-readable medium having computer executable software code stored thereon, the code for processing a telephone call, the code comprising:
    code for receiving a telephone call directed to a called station from a calling station; and
    code for determining an on-line state of a data terminal at the called station, the called station being busy as a result of a data connection between the data terminal and a server, the on-line state being available-for-incoming-calls or not-available-for-incoming-calls.

14. A computer-readable medium according to claim 13, further comprising code for processing the telephone call according to the on-line state.

15. A programmed computer for processing a telephone call, comprising:
    a memory having at least one region for storing computer executable program code; and
    a processor for executing the program code stored in the memory; wherein the program code includes code for receiving a telephone call directed to a called station from a calling station; and
    code for determining an on-line state of a data terminal at the called station, the called station being busy as a result of a data connection between the data terminal and a server, the on-line state being available-for-incoming-calls or not-available-for-incoming-calls.

16. A programmed computer according to claim 15, further comprising code for processing the telephone call according to the on-line state.

17. Computer executable software code stored on a computer readable medium, the code for processing a telephone call, the code comprising:
    code for connecting a data terminal at a called station to a server by a data connection, the called station being busy as a result of the data connection; and
    code for setting an on-line state for the data terminal, the state being available-for-incoming-calls or not-available-for-incoming-calls.

18. Computer executable software code according to claim 17, further comprising code for informing the server of the on-line state.

19. A computer-readable medium having computer executable software code stored thereon, the code for processing a telephone call, the code comprising:

code for connecting a data terminal at a called station to a server by a data connection, the called station being busy as a result of the data connection; and code for setting an on-line state for the data terminal, the state being available-for-incoming-calls or not-available-for-incoming-calls.

20. A computer-readable medium according to claim 19, further comprising code for informing the server of the on-line state.

21. A programmed computer for processing a telephone call, comprising:

a memory having at least one region for storing computer executable program code; and processor for executing the program code stored in the memory; wherein the program code includes code for connecting a data terminal at a called station to a server by a data connection, the called station being busy as a result of the data connection; and code for setting an on-line state for the data terminal, the state being available-for-incoming-calls or not-available-for-incoming-calls.

22. A programmed computer according to claim 21, further comprising code for informing the server of the on-line state.

23. A method comprising:

receiving a call directed to a called station from a calling station;

determining an on-line state of a data terminal at the called station, the called station being busy as a result of a data connection between the data terminal and a server, the on-line state being available-for-incoming calls or not-available-for-incoming-calls;

if the on-line state is available-for-incoming-calls, sending an alert message to the data terminal to alert a user at the data terminal of the incoming call; and if the on-line state is not-available for incoming calls, processing the incoming call without alerting the user of the incoming call.

24. The method of claim 23 wherein the user activates the on-line state.

25. The method of claim 23 further comprising:

if the on-line state is not-available-for-incoming-calls, processing the incoming call in accordance with the not-available-for-incoming-calls state.

26. The method of claim 25 wherein the processing of the incoming call in accordance with the not-available-for-incoming-calls state is selected from the group consisting of sending the incoming call to voice mail, forwarding the incoming call to a second number and not answering the incoming call.

27. The method of claim 23 wherein the not-available-for-incoming-calls state allows the user to work on-line without being disturbed while incoming calls are processed in accordance with preset instructions.

28. The method of claim 23 further comprising:

if the on-line state is available-for-incoming-calls, processing the incoming call in accordance with the available-for-incoming-calls state.

29. The method of claim 28 wherein the processing of the incoming call in accordance with the available-for-incoming-call state is selected from the group consisting of answering the incoming call, sending the incoming call to voice mail, forwarding the incoming call to a second number and not answering the incoming call.

* * * * *

UNITED STATES PATENT AND TRADEMARK OFFICE
CERTIFICATE OF CORRECTION

PATENT NO. : 6,438,222 B1
DATED : August 20, 2002
INVENTOR(S) : Frederick Murray Burg It is certified that error appears in the above-identified patent and that said Letters Patent is hereby corrected as shown below:

<u>Title page,</u>
Item [57], ABSTRACT,
Lines 12 & 13, the last sentence of the ABSTRACT is corrected to read as follows:

-- If the state is not available for incoming calls, the caller may be informed and the call is forwarded to another number or sent to messaging according to the subscriber's preset instructions. --

Signed and Sealed this

Seventeenth Day of December, 2002

JAMES E. ROGAN
*Director of the United States Patent and Trademark Office*